United States Patent
Toso et al.

(10) Patent No.: US 9,523,944 B2
(45) Date of Patent: Dec. 20, 2016

(54) BELT TENSION ADJUSTMENT MECHANISM AND IMAGE FORMING APPARATUS

(71) Applicant: Konica Minolta, Inc., Tokyo (JP)

(72) Inventors: Yoshiyuki Toso, Toyokawa (JP);
Shoichi Yoshikawa, Okazaki (JP);
Atsuhiko Shimoyama, Tahara (JP);
Masahiro Yamaguchi, Toyokawa (JP);
Yasuhiro Suzuki, Toyohashi (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/986,026

(22) Filed: Dec. 31, 2015

(65) Prior Publication Data

US 2016/0195835 A1 Jul. 7, 2016

(30) Foreign Application Priority Data

Jan. 6, 2015 (JP) ................................ 2015-000596

(51) Int. Cl.
*G03G 15/16* (2006.01)
*F16H 7/12* (2006.01)
*F16H 7/08* (2006.01)

(52) U.S. Cl.
CPC .......... *G03G 15/161* (2013.01); *F16H 7/1281* (2013.01); *F16H 2007/0806* (2013.01);
(Continued)

(58) Field of Classification Search
None
See application file for complete search history.

(56) References Cited

U.S. PATENT DOCUMENTS 5,258,816 A * 11/1993 Haneda .............. G03G 15/0105
198/814
6,704,528 B1 * 3/2004 Kawamura .......... G03G 15/168
399/101
(Continued)

FOREIGN PATENT DOCUMENTS

JP 63-188175 A 8/1988
JP 2005-326011 A 11/2005

*Primary Examiner* — David Gray
*Assistant Examiner* — Thomas Giampaolo, II
(74) *Attorney, Agent, or Firm* — Lucas & Mercanti, LLP (57) ABSTRACT

A tension roller which is brought into contact with an inner circumferential surface of an endless belt and is rotated and which can be moved to a first position where the belt is in a relaxed state and a second position where the belt is in a tensioned state, a butting member which butts against the belt, a force application unit which applies, to the butting member, a force acting in a direction opposite to a rotation direction of the belt and a movement mechanism which moves the tension roller to the first position and the second position are provided. When the belt is rotated, the butting member is moved in the rotation direction of the belt by a friction force with the belt, and the movement mechanism moves the tension roller from the first position to the second position by the movement of the butting member in the rotation direction of the belt. When the rotation of the belt is stopped, the butting member is moved in the direction opposite to the rotation direction of the belt by the force applied by the force application unit, and the movement mechanism moves the tension roller from the second position to the first position by the movement of the butting member in the direction opposite to the rotation direction of the belt.

6 Claims, 9 Drawing Sheets

(52) U.S. Cl.
CPC ............ *F16H 2007/0865* (2013.01); *F16H 2007/0893* (2013.01); *F16H 2007/0895* (2013.01)

(56) References Cited

U.S. PATENT DOCUMENTS

2003/0091373 A1* 5/2003 Abe ................. B65G 23/44
399/302
2005/0081889 A1* 4/2005 Nakano ............ G03G 15/161
134/6

* cited by examiner

BELT TENSION ADJUSTMENT MECHANISM AND IMAGE FORMING APPARATUS

This application is based on Japanese Patent Application No. 2015-000596 filed on Jan. 6, 2015 the contents of which are hereby incorporated by reference.

BACKGROUND OF THE INVENTION

Field of the Invention

The present invention relates to a belt tension adjustment mechanism and an image forming apparatus using such a belt tension adjustment mechanism.

Description of the Related Art

A belt unit in which an endless belt is laid in a tensioned state by a plurality of rollers and which drives the endless belt in a circumferential direction is widely used as, for example, an intermediate transfer belt or the like in an electrophotographic image forming apparatus. In such a belt unit, when the belt is left in a tensioned state for a long period of time, creep (phenomenon in which when a sustained stress acts on an object, a distortion is increased with time) occurs, and this can cause an uneven image or the like. Hence, when the belt is not rotated, the belt is brought into a relaxed state by releasing the tension of the belt, and thus a creep deformation is prevented from occurring on the belt.

For example, Japanese Unexamined Patent Application Publication No. 2005-326011 proposes a tension adjustment mechanism in which a tension roller is provided on the side of the rotation end of a swing arm and in which when a belt is rotated, the swing arm is rotated in a direction in which a tension is applied to the belt by the tension roller whereas when the belt is stopped, the swing arm is rotated in a direction in which the tension of the belt applied by the tension roller is released.

Japanese Unexamined Patent Application Publication No. 63-188175 proposes a transfer belt support mechanism which includes a swing member and a force application member that applies a tension to a belt by the swinging of the swing member, and in which when the belt is rotated, the force application member applies the tension to the belt by the swinging of the swing member in a predetermined direction whereas when the belt is stopped, the tension of the belt produced by the force application member is released by the swinging of the swing member in the opposite direction.

However, in the technology proposed by Japanese Unexamined Patent Application Publication No. 2005-326011, since a torque limiter is used, a torque is increased by an amount corresponding to a torque resulting from the idling of a crutch. Moreover, disadvantageously, a space occupied by the tension arm is large, and thus the size of the apparatus is increased. On the other hand, in the technology proposed by Japanese Unexamined Patent Application Publication No. 63-188175, the mechanism is disadvantageously complicated so as to be expensive.

Moreover, although in an image forming apparatus, in order to prevent a color shift, it is necessary to keep integral multiples of the length of a belt, the diameter of a photosensitive member and the diameter of a drive roller, when the diameter of the drive roller is decreased so that the size of the apparatus is reduced, the creep deformation of the belt is increased. Hence, the creep deformation of the belt is a significant obstacle to the reduction of the size of the apparatus.

The present invention is made in view of the foregoing conventional problem, and an object of the present invention is to provide a belt tension adjustment mechanism in which a torque is low and the occupied space is small and which can adjust a belt tension with a simple mechanism and can prevent the creep deformation of a belt.

SUMMARY OF THE INVENTION

In order to achieve the object described above, according to the present invention, there is provided a belt tension adjustment mechanism including: a tension roller which is brought into contact with an inner circumferential surface of an endless belt and is rotated and which can be moved to a first position where the belt is in a relaxed state and a second position where the belt is in a tensioned state; a butting member which butts against the belt; a force application unit which applies, to the butting member, a force acting in a direction opposite to a rotation direction of the belt; and a movement mechanism which moves the tension roller to the first position and the second position, where when the belt is rotated, the butting member is moved in the rotation direction of the belt by a friction force with the belt, and the movement mechanism moves the tension roller from the first position to the second position by movement of the butting member in the rotation direction of the belt, and when the rotation of the belt is stopped, the butting member is moved in the direction opposite to the rotation direction of the belt by the force applied by the force application unit, and the movement mechanism moves the tension roller from the second position to the first position by movement of the butting member in the direction opposite to the rotation direction of the belt.

Preferably, here, the butting member is an elastic member which has a substantially equal length to the length of the belt in a width direction.

More specifically, as the configuration described above, the following configuration may be adopted: the butting member butts against the tension roller through the belt, and can be moved in a circumferential direction about a support shaft of the tension roller, the movement mechanism includes a compression coil spring whose one end butts against the support shaft of the tension roller and a compression mechanism which compresses the compression coil spring when the butting member is moved in the rotation direction of the belt, when the butting member is moved in the rotation direction of the belt by the rotation of the belt, the compression coil spring is compressed by the compression mechanism, and the tension roller is moved from the first position to the second position and when the rotation of the belt is stopped, the butting member is moved by the force application unit in the direction opposite to the rotation direction of the belt, the compression of the compression coil spring by the compression mechanism is released and the tension roller is moved from the second position to the first position.

More specifically, as the configuration described above, the following configuration may be adopted: the butting member butts against the tension roller through the belt, the movement mechanism rotatably supports a support shaft of the tension roller, supports the butting member and is a housing which can be swung about a swing shaft different from the support shaft, when the butting member is moved in the rotation direction of the belt by the rotation of the belt, the housing is moved about the swing shaft in the rotation direction of the belt, and the tension roller is moved from the first position to the second position and when the rotation of the belt is stopped, the housing is moved by the force application unit about the swing shaft in the direction opposite to the rotation direction of the belt, and the tension roller is moved from the second position to the first position.

More specifically, as the configuration described above, the following configuration may be adopted: the butting member butts against the tension roller through the belt, the force application unit is a compression coil spring, the movement mechanism is a housing which supports the butting member and which can be swung about the support shaft, when the butting member is moved in the rotation direction of the belt by the rotation of the belt, the housing is moved about the support shaft in the rotation direction of the belt to compress the compression coil spring and the tension roller is moved from the first position to the second position and when the rotation of the belt is stopped, the housing is moved by the compression coil spring about the support shaft in the direction opposite to the rotation direction of the belt, and the tension roller is moved from the second position to the first position.

According to the present invention, there is provided an image forming apparatus including: an endless intermediate transfer belt which is placed over a plurality of rollers; and a cleaning blade which removes a non-transferred toner from a surface of the intermediate transfer belt, where as a tension adjustment mechanism of the intermediate transfer belt, any one of the belt tension adjustment mechanisms described above is used, and as the butting member, the cleaning blade is used.

DESCRIPTION OF PREFERRED EMBODIMENTS

Although a belt tension adjustment mechanism and an image forming apparatus according to the present invention will be described below with reference to drawings, the present invention is not limited to these embodiments at all.

(Entire Configuration of Printer)

Figure 1:
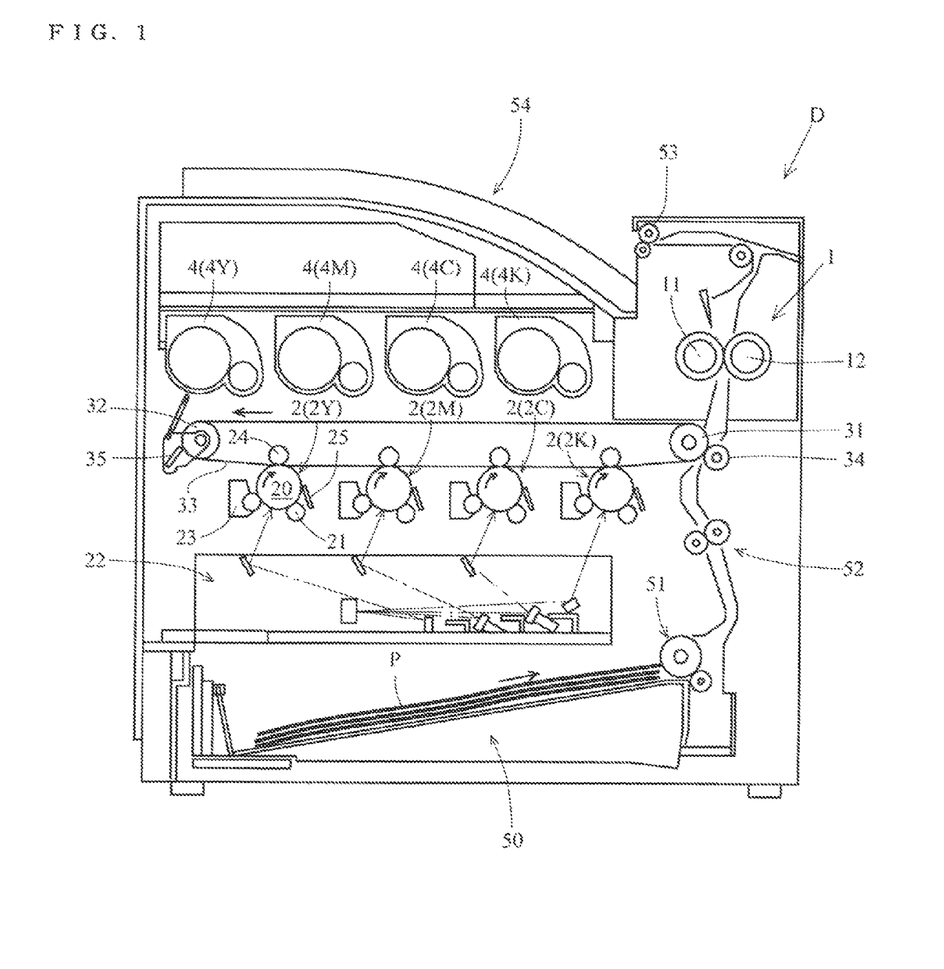
FIG. 1 A schematic view showing an example of an image forming apparatus and a belt tension adjustment mechanism according to the present invention.

FIG. 1 is a schematic view showing an embodiment of the image forming apparatus according to the present invention. The image forming apparatus D of FIG. 1 is a so-called tandem-type color printer. The present invention can naturally be applied not only to a printer but also a copying machine having a scanner, a facsimile, a multifunctional machine having these functions in a composite manner and the like.

The image forming apparatus D includes an endless intermediate transfer belt 33 that has conductivity. The intermediate transfer belt 33 is placed over a drive roller 31 and a tension roller 32 arranged on both the left and right sides in the figure. The drive roller 31 is coupled to an unillustrated motor, the drive roller 31 is rotated counterclockwise by the drive of the motor and thus the intermediate transfer belt 33 and the tension roller 32 in contact therewith are driven to rotate. A secondary transfer roller 34 is pressed onto the outside of the portion of the belt supported by the drive roller 31. In the nip portion (secondary transfer region) between the secondary transfer roller 34 and the intermediate transfer belt 33, a toner image formed on the intermediate transfer belt 33 is transferred to a sheet P which is transported.

On the outside of the portion of the belt supported by the tension roller 32, a cleaning blade 35 is provided that cleans the surface of the intermediate transfer belt 33. The cleaning blade 35 is pressed onto the tension roller 32 through the intermediate transfer belt 33, and collects, with its contact portion, a toner that is not transferred. The cleaning blade 35 can be moved in a circumferential direction about the support shaft 36 of the tension roller 32. The movement mechanism of the cleaning blade 35 will be described later.

On the lower side of the intermediate transfer belt 33 placed over the drive roller 31 and the tension roller 32, sequentially from the upstream side in the rotation direction of the intermediate transfer belt 33, four image formation portions 2Y, 2M, 2C and 2K (hereinafter also collectively referred to as "image formation portions 2") of yellow (Y), magenta (M), cyan (C) and black (B) are arranged. In these image formation portions 2, the developers of the individual colors are used to produce toner images of the corresponding colors.

The image formation portion 2 includes a cylindrical photosensitive member 20 as an electrostatic latent image carrying member. Around the photosensitive member 20, along the rotation direction (clockwise direction), a charging unit 21, a development device 23, a primary transfer roller 24 and a photosensitive member cleaning member 25 are sequentially arranged. The primary transfer roller 24 is pressed onto the photosensitive member 20 through the intermediate transfer belt 33 to form the nip portion (primary transfer region). Below the image formation portions 2, an exposure device 22 is arranged.

Although in the embodiment shown in the figure, as the charging unit 21, the charging unit of a roller charging system is used, the type of charging unit 21 is not particularly limited, and the charger of a corona discharge system, a blade-shaped charging member, a brush-shaped charging member and the like may naturally be used. Although in this embodiment, as the photosensitive member cleaning member 25, a plate-shaped blade is used, one end side thereof is brought into contact with the outer circumferential surface of the photosensitive member 20 and thus toner left on the surface of the photosensitive member 20 is collected and removed, the photosensitive member cleaning member 25 is not limited to the plate-shaped blade, and for example, a fixed brush, a rotation brush, a roller and a combination of a plurality of members described above can also be used. It is not always necessary to provide the photosensitive member cleaning member 25, and a cleaner-less system in which the collection of the toner that is not transferred on the photosensitive member 20 is performed by the development device 23 can also be adopted.

Above the intermediate transfer belt 33, hoppers 4Y, 4M, 4C and 4K (hereinafter also collectively referred to as "hoppers 4") are arranged that store toners supplied to the development devices 23 of the individual colors. Below the exposure device 22, as a paper feed device, a paper feed cassette 50 is removably arranged. Sheets (transferred members) P stacked and stored within the paper feed cassette 50 are fed out one by one to a transport path sequentially from the uppermost sheet by the rotation of a paper feed roller 51 arranged in the vicinity of the paper feed cassette 50. The sheet P fed out from the paper feed cassette 50 is transported to a resist roller pair 52, where the sheet P is fed out to the secondary transfer region with predetermined timing.

The image forming apparatus D can switch between a monochrome mode where the toner of one color (for example, black) is used to form a monochrome image and a color mode where the toners of four colors are used to form a color image.

An example of an image formation operation in the color mode will be briefly described. First, in each of the image formation portions 2, the outer circumferential surface of the photosensitive member 20 which is driven to rotate at a predetermined circumferential velocity is charged by the charging unit 21. Then, light corresponding to image information is projected from the exposure device 22 to the charged surface of the photosensitive member 20, and thus an electrostatic latent image is formed. Then, when the electrostatic latent image is actualized by the toner serving as a developer supplied from the development device 23. The toner images of the individual colors formed on the surfaces of the photosensitive members 20 in this way reach the primary transfer region by the rotation of the photosensitive members 20, yellow, magenta, cyan and black are transferred (primarily transferred) in this order onto the intermediate transfer belt 33 from the photosensitive members 20 and are superimposed.

The non-transferred toner which is not transferred to the intermediate transfer belt 33 and which is left on the photosensitive member 20 is scraped by the photosensitive member cleaning member 25 and is thereby removed from the outer circumferential surface of the photosensitive member 20.

The toner images of the four colors superimposed are transported by the intermediate transfer belt 33 to the secondary transfer region. On the other hand, the sheet P is transported from the resist roller pair 52 to the secondary transfer region so as to match the timing. Then, in the secondary transfer region, the toner images of the four colors are transferred (secondarily transferred) from the intermediate transfer belt 33 to the sheet P. The sheet P to which the toner images of the four colors are transferred is transported to a fixing device 1. In the fixing device 1, the sheet P is passed through the nip portion between a fixing roller 11 and a pressure roller 12. In the meantime, the sheet P is heated and pressurized, and thus the toner images on the sheet P are melted and fixed to the sheet P. The sheet P to which the toner images are fixed is ejected by an ejection roller pair 53 to a paper ejection tray 54.

On the other hand, the intermediate transfer belt 33 passed through the secondary transfer region is cleaned by the cleaning blade 35. Thereafter, the drive and rotation of the photosensitive members 20 and the intermediate transfer belt 33 is stopped.

(Tension Adjustment Mechanism of Intermediate Transfer Belt)

Figure 2:
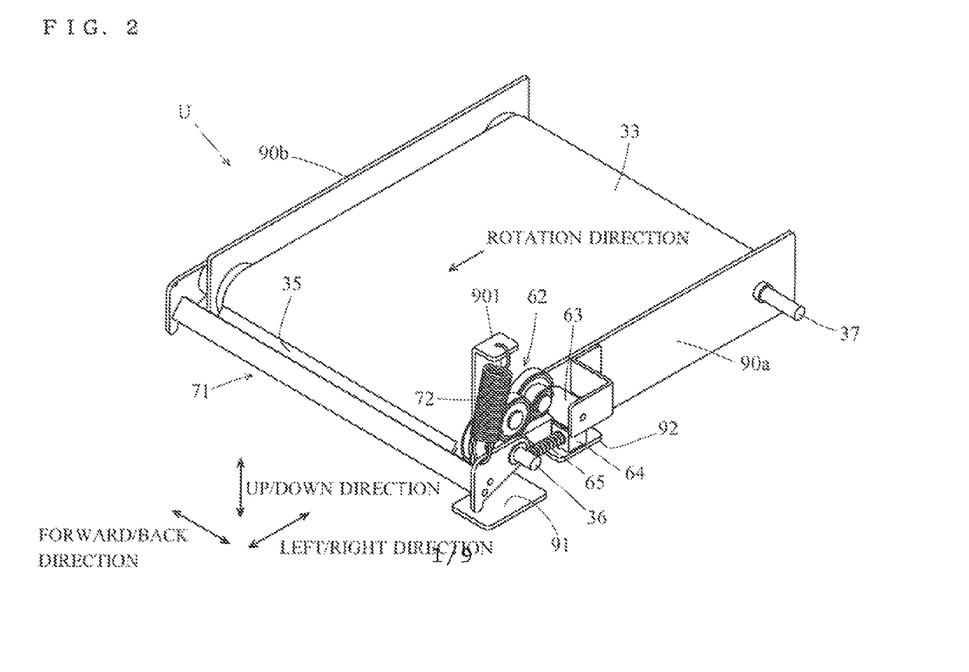
FIG. 2 A perspective view of an intermediate transfer belt unit when the intermediate transfer belt unit is seen from above.
Figure 3:
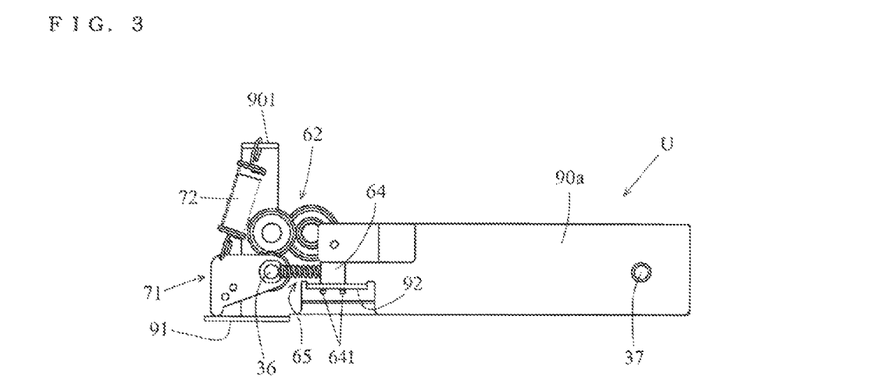
FIG. 3 A front view of the intermediate transfer belt unit.
Figure 4:
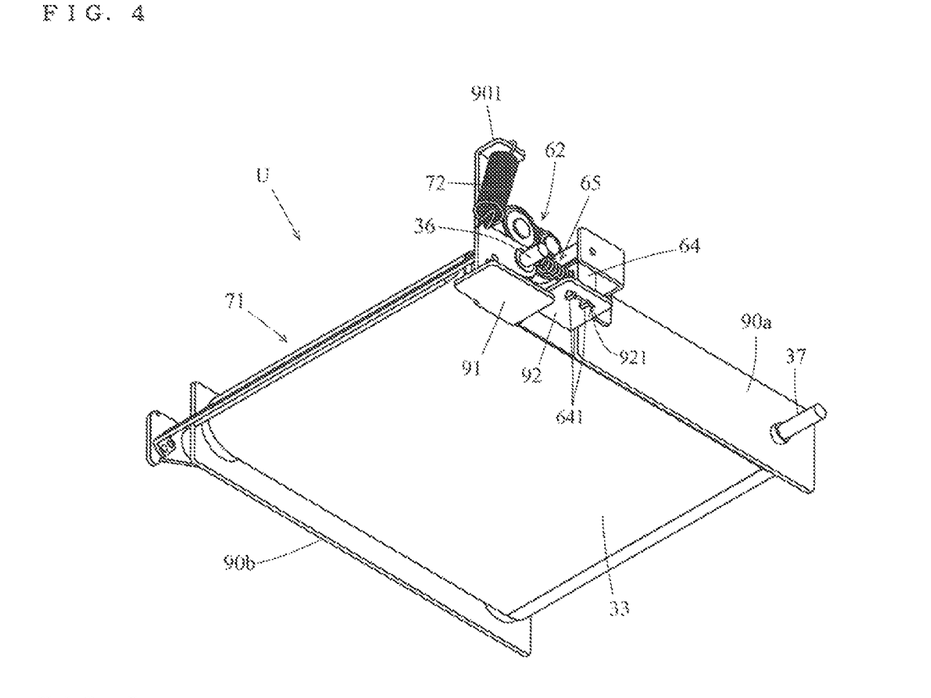
FIG. 4 A perspective view of the intermediate transfer belt unit when the intermediate transfer belt unit is seen from below.

FIG. 2 is a perspective view of an intermediate transfer belt unit U when the intermediate transfer belt unit U is seen from above, FIG. 3 is a front view and FIG. 4 is a perspective view when the intermediate transfer belt unit U is seen from below. In the present specification, an up/down direction, a forward/backward direction and a left/right direction indicate directions shown in FIG. 2.

Figure 6:
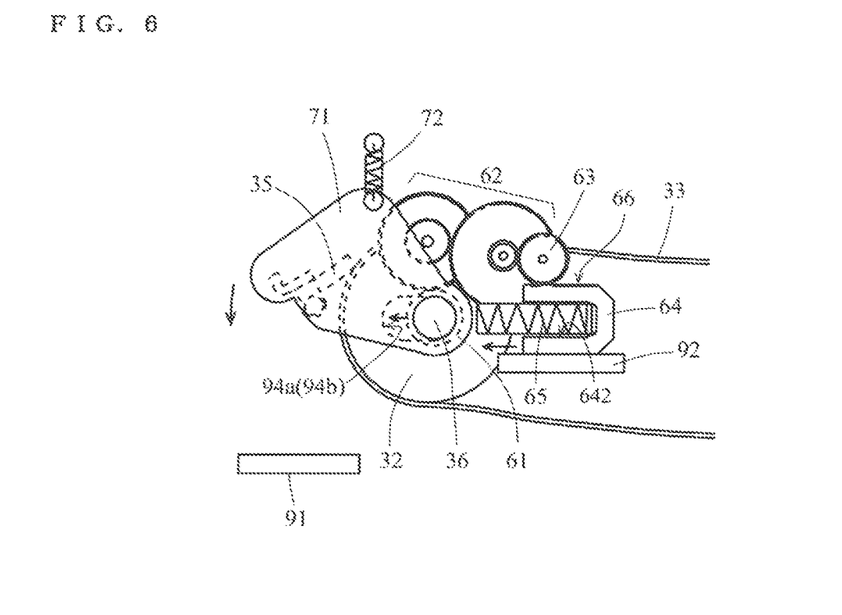
FIG. 6 A peripheral configuration diagram of a tension roller and a cleaning blade when the tension roller in a first embodiment is in a first position.

In the intermediate transfer belt unit U, a support shaft 37 fixed to the drive roller 31 and a support shaft 36 fixed to the tension roller 32 are rotatably supported a predetermined distance apart in the left/right direction to frames 90a and 90b arranged apart from and opposite each other in the forward/backward direction, and the intermediate transfer belt 33 is placed between the drive roller 31 and the tension roller 32. As will be described later, the support shaft 36 is supported into long holes 94a and 94b (which are shown in FIG. 6) formed in the frames 90a and 90b, and the support shaft 36 can be moved in the left/right direction with respect to the frames 90a and 90b.

Figure 7:
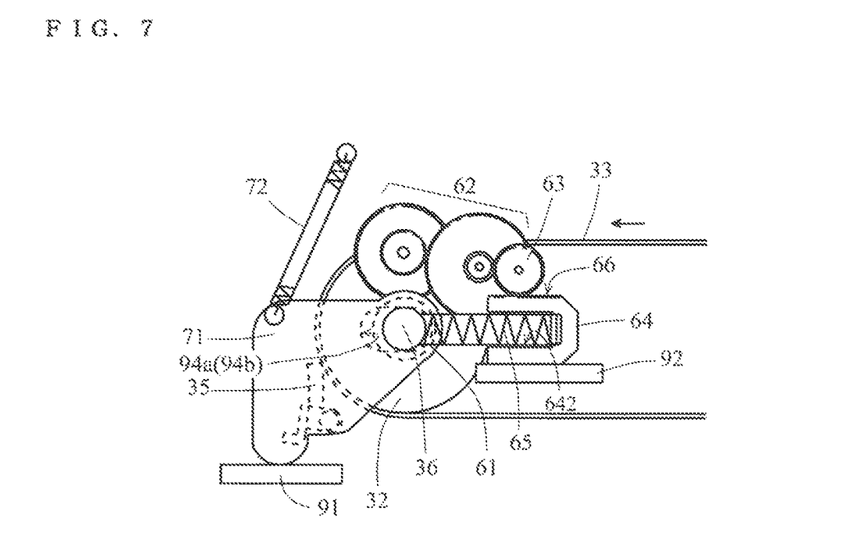
FIG. 7 A peripheral configuration diagram of the tension roller and the cleaning blade when the tension roller in a first embodiment is in a second position.

The frame 90a includes a locking portion 901 that is extended upward from an upper portion of a left-side end, a butting stage 91 that is extended in an outward direction from a lower portion of the left-side end and a base stage 92 that is raised perpendicularly to the frame 90a in the leftward direction with respect to the butting stage 91 from a lower end of the frame 90a in an outward direction. In the base stage 92, a sliding long hole 921 (which is shown in FIG. 4) is formed in the left/right direction. Two locking portions 641 (which are shown in FIGS. 3 and 4) that are formed in the bottom surface of a pressing member 64 and which are formed in the shape of an inverted letter T are fitted into the sliding long hole 921. In this way, the pressing member 64 is retained so as to be freely moved on the base stage 92 in the left/right direction. In the pressing member 64, an engagement hole 642 (which is shown in FIGS. 6 and 7) is formed inward from the left-side surface, and a rack teeth 66 is formed in the upper surface. As will be described later, one end of a compression coil spring 65 is engaged into the engagement hole 642, and a pinion gear 63 pivoted on the frame 90a meshes with the rack teeth 66.

Figure 5:
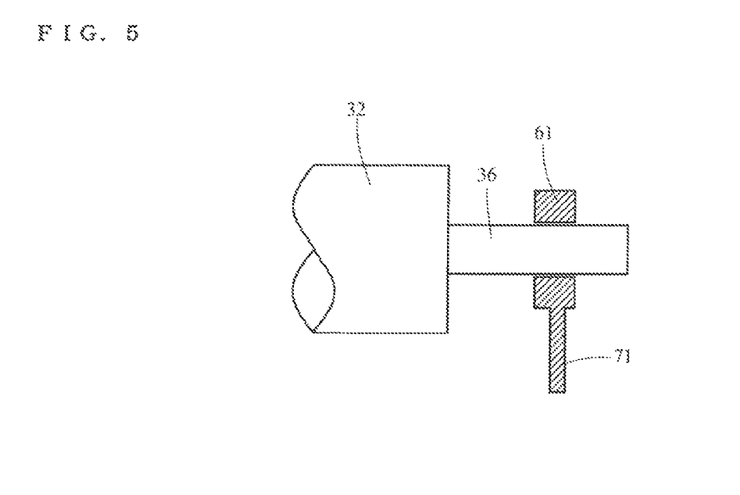
FIG. 5 A diagram showing a pinion gear formed in an outer circumferential portion of a shaft hole on the front side of a housing.

The shaft hole of a housing 71 is engaged into the support shaft 36 protruding outward from the frames 90a and 90b, and the housing 71 is swingably attached to the support shaft 36. The cleaning blade 35 is attached to the housing 71 so as to be pressed onto the tension roller 32 through the intermediate transfer belt 33. As shown in FIG. 5, in an outer circumferential portion of the shaft hole on the front side of the housing 71, a shaft gear 61 is formed integrally with the housing 71.

Between the housing 71 and the locking portion 901 of the frame 90a, a tension coil spring 72 is interposed, and a force acting in a direction opposite to the rotation direction of the intermediate transfer belt 33 is constantly applied by the tension coil spring 72 to the housing 71. Although when the intermediate transfer belt 33 is rotated, the housing 71 is rotated by a friction force between the intermediate transfer belt 33 and the cleaning blade 35 in the rotation direction of the intermediate transfer belt 33, the lower end of the housing 71 butts against the butting stage 91 of the frame 90a, and thus the further rotation of the housing 71 is limited.

On the outside surface of the frame 90a, a drive transmission gear train 62 and the pinion gear 63 are rotatably provided. The most upstream gear of the drive transmission gear train 62 in a drive transmission direction meshes with the shaft gear 61, and the most downstream gear meshes with the pinion gear 63. The pinion gear 63 meshes with the rack teeth 66 formed in the upper surface of the pressing member 64. Here, the shaft gear 61, the drive transmission gear train 62, the pinion gear 63, the rack teeth 66 and the pressing member 64 form a compression mechanism that compresses the compression coil spring 65. The shaft gear 61 and the rack teeth 66 of the pressing member 64 may form the compression mechanism.

FIGS. 6 and 7 show peripheral configuration diagrams of the tension roller 32 and the cleaning blade 35. FIG. 6 shows the relaxed state of the intermediate transfer belt 33, and FIG. 7 shows the tensioned state of the intermediate transfer belt 33.

In the belt tension adjustment mechanism configured as described above, when the rotation of the intermediate transfer belt 33 is stopped as shown in FIG. 6, an interval between the pressing member 64 and the support shaft 36 is formed such that an acting force is not applied by the compression coil spring 65. In this way, the tension roller 32 is in such a first position that the intermediate transfer belt 33 is in the relaxed state. Even in this state, the cleaning blade 35 is pressed onto the intermediate transfer belt 33 with a predetermined pressing formed.

Then, when the drive roller 31 (which is shown in FIG. 1) is driven, though the intermediate transfer belt 33 is in the relaxed state, the intermediate transfer belt 33 is forcibly driven to rotate by the nip portion between the drive roller 31 and the secondary transfer roller 34. Then, a friction force is produced between the intermediate transfer belt 33 and the cleaning blade 35, and thus the housing 71 to which the cleaning blade 35 is attached is rotated against the force applied by the tension coil spring 72, in the rotation direction (counterclockwise in FIG. 6) of the intermediate transfer belt 33, about the support shaft 36. Here, a force produced by a belt drive force and the friction force needs to be larger than the resultant of the force applied by the tension coil spring 72 and the pressing force of the cleaning blade 35.

Then, as shown in FIG. 7, as the housing 71 is rotated, the shaft gear 61 formed integrally with the housing 71 is rotated, and the drive transmission gear train 62 and the pinion gear 63 which mesh with the shaft gear 61 are rotated.

Then, the pressing member 64 is moved together with the rack teeth 66 in a direction approaching the support shaft 36 by the rotation of the pinion gear 63. In this way, the compression coil spring 65 is compressed, the support shaft 36 is moved in the leftward direction within long holes 94a and 94b by the force applied by the compression coil spring 65, and the tension roller 32 is placed in such a second position that the intermediate transfer belt 33 is in the tensioned state. Although the tension of the intermediate transfer belt 33 is gradually increased by the movement of the tension roller 32 in the leftward direction, the housing 71 butts against the butting stage 91 and thus the further rotation of the housing 71 is limited, with the result that the tension of the intermediate transfer belt 33 is maintained to be a predetermined value.

Then, when the rotation of the intermediate transfer belt 33 is stopped, the resultant of the force applied by the tension coil spring 72 and the pressing force of the cleaning blade 35 is larger than the force produced by the belt drive force and the friction force, and thus the housing 71 is rotated in a direction (counterclockwise in FIG. 7) opposite to the rotation direction of the intermediate transfer belt 33 about the support shaft 36. As the housing 71 is rotated in the opposite direction, the shaft gear 61, the drive transmission gear train 62 and the pinion gear 63 are rotated in the opposite direction, and the pressing member 64 is moved together with the rack teeth 66 by the opposite rotation of the pinion gear 63 in a direction in which they are separated from the support shaft 36. In this way, the compression of the compression coil spring 65 is released, the support shaft 36 is moved in the rightward direction within the long hole 94 and thus the tension roller 32 is returned to the first position in which the intermediate transfer belt 33 is in the relaxed state.

The cleaning blade 35 has not only the function of rotating the housing 71 and the support shaft 36 but also the function of removing the non-transferred toner, foreign substances and the like on the intermediate transfer belt 33. In terms of sufficiently achieving the cleaning functions described above, it is desirable to provide, in the housing 71, a discharge path for the non-transferred toner, foreign substances and the like and to provide a mechanism of supplying air, vibrations or the like for removing the non-transferred toner, foreign substances and the like deposited on the cleaning blade 35.

(Second Embodiment)

Figure 8:
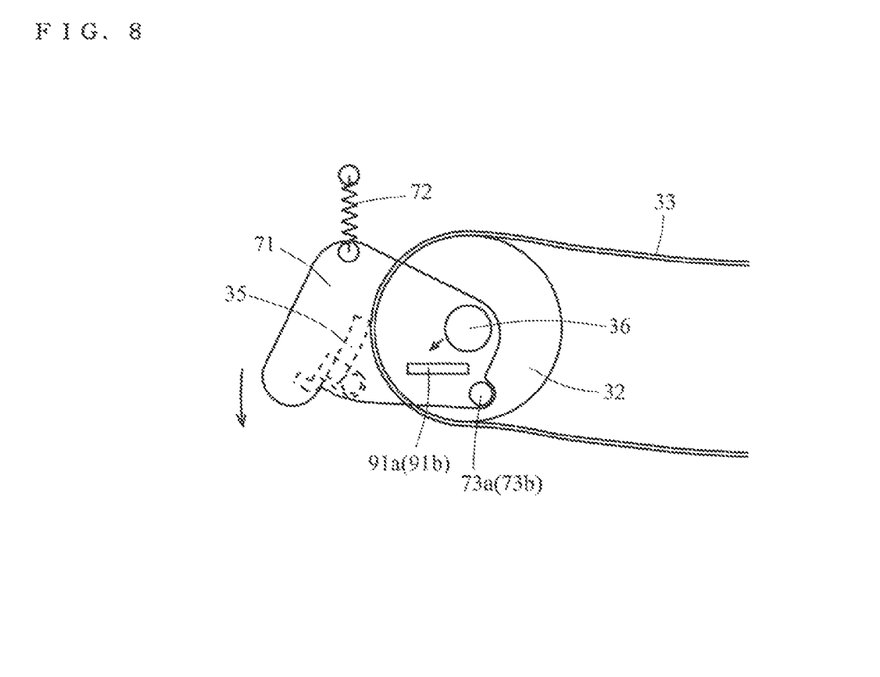
FIG. 8 A peripheral configuration diagram of the tension roller and the cleaning blade when the tension roller in a second embodiment is in the first position.
Figure 9:
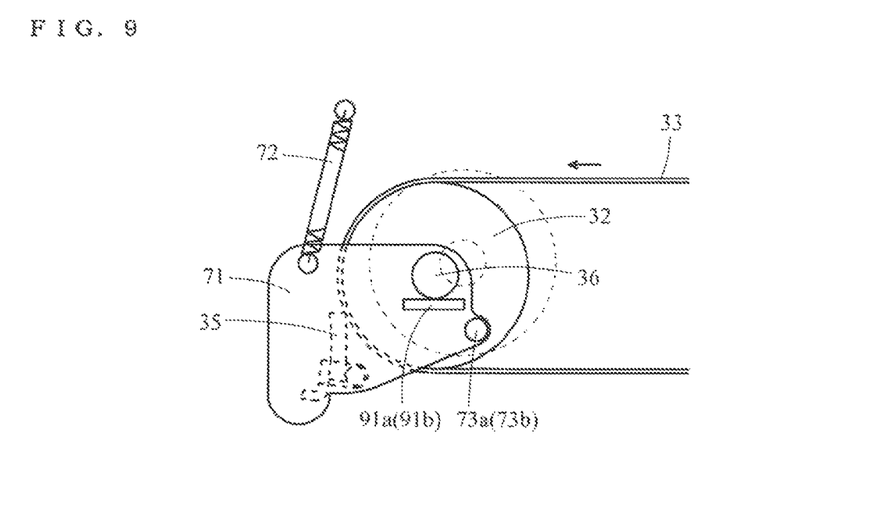
FIG. 9 A peripheral configuration diagram of the tension roller and the cleaning blade when the tension roller in the second embodiment is in the second position.
Figure 10:
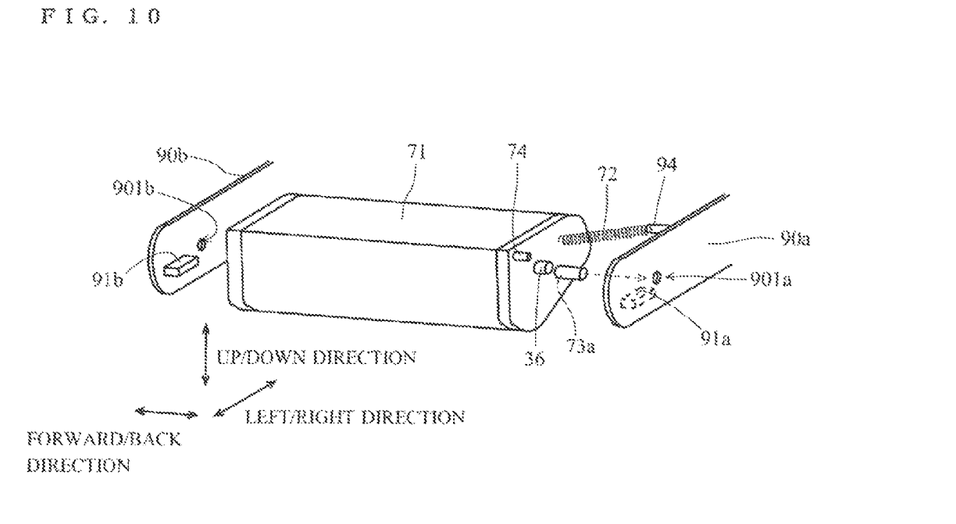
FIG. 10 A perspective view for illustrating the attachment of the housing to the frame of an intermediate transfer belt unit in the second embodiment.
Figure 11:
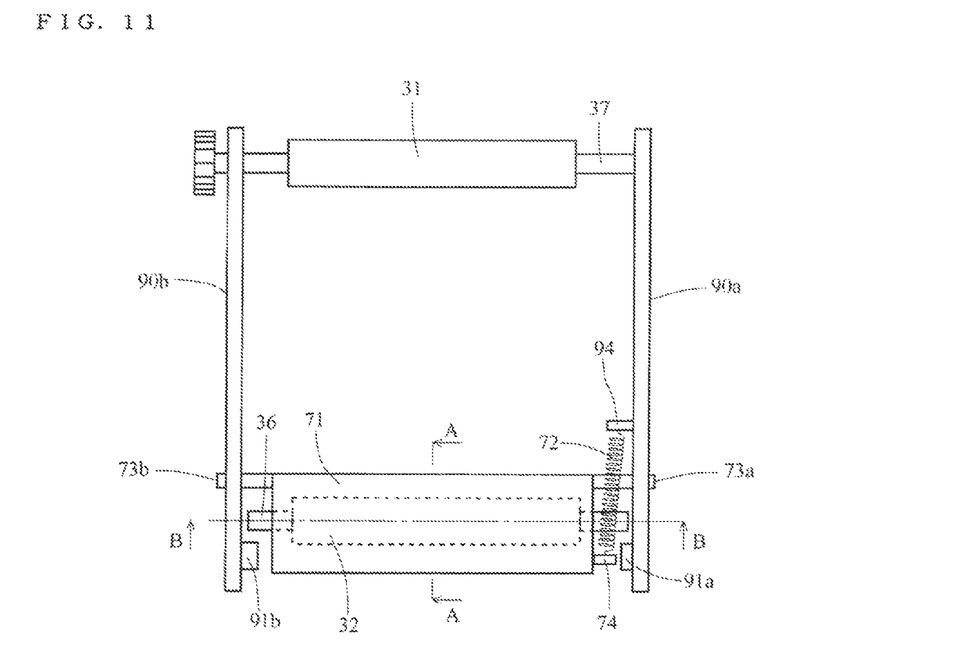
FIG. 11 A plan view for illustrating the attachment of the housing to the frame of the intermediate transfer belt unit in the second embodiment.
Figure 12:
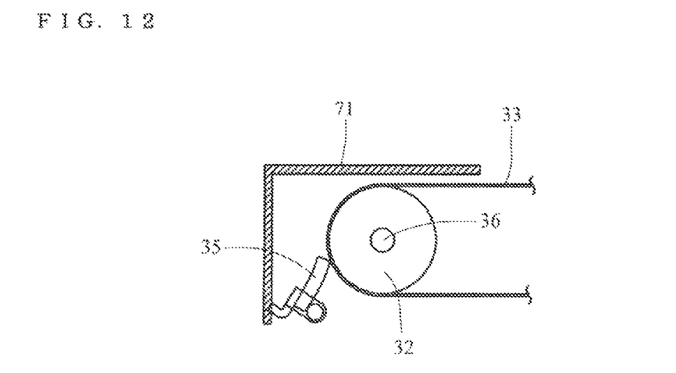
FIG. 12 A cross-sectional view taken along line A-A of FIG. 11.
Figure 13:
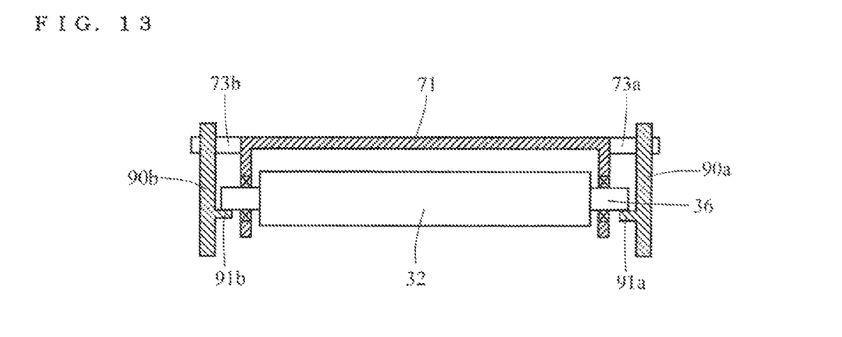
FIG. 13 A cross-sectional view taken along line B-B of FIG. 11.

FIGS. 8 and 9 show configuration diagrams showing another embodiment of the belt tension adjustment mechanism according to the present invention. FIG. 10 shows a perspective view for illustrating an attachment to the frames 90a and 90b of the housing 71 though the housing 71 differs in shape from the housing shown in FIGS. 8 and 9. FIG. 11 shows a plan view thereof. FIGS. 12 and 13 respectively show a cross-sectional view taken along line A-A of FIG. 11 and a cross-sectional view taken along line B-B of FIG. 11.

As shown in FIG. 10, swinging shafts 73a and 73b formed in both side surfaces in the front and back of the housing 71 are inserted through shaft holes 901a and 901b formed in the frames 90a and 90b, and the housing 71 is swingably attached to the frames 90a and 90b about the swinging shafts 73a and 73b. Between a pin 74 formed in the housing 71 and a pin 94 formed in the frame 90a, the tension coil spring 72 is interposed. In this way, a force acting in a direction opposite to the rotation direction of the intermediate transfer belt 33 is constantly applied to the housing 71. On the inside surfaces of the frames 90a and 90b, butting stages 91a and 91b are provided so as to protrude to the side of the housing 71.

FIG. 8 is a diagram when the intermediate transfer belt 33 is in the relaxed state, and FIG. 9 is a diagram when the intermediate transfer belt 33 is in the tensioned state. The cleaning blade 35 and the support shaft 36 of the tension roller 32 are attached to the housing 71. The cleaning blade 35 is pressed onto the intermediate transfer belt 33 with a predetermined pressing force.

In the belt tension adjustment mechanism configured as described above, when the rotation of the intermediate transfer belt 33 is stopped as shown in FIG. 8, the housing 71 is located on the upstream side in the rotation direction of the intermediate transfer belt 33 by a force applied by the tension coil spring 72, and the tension roller 32 is in the first position in which the intermediate transfer belt 33 is in the relaxed state.

Then, when the drive roller 31 (which is shown in FIG. 1) is driven, as described previously, though the intermediate transfer belt 33 is in the relaxed state, the intermediate transfer belt 33 is forcibly driven to rotate by the nip portion between the drive roller 31 and the secondary transfer roller 34. Then, a friction force is produced between the intermediate transfer belt 33 and the cleaning blade 35, and thus the housing 71 to which the cleaning blade 35 is attached is rotated against the force applied by the tension coil spring 72, in the rotation direction (counterclockwise in FIG. 8) of the intermediate transfer belt 33, about the support swinging shafts 73a and 73b. Here, as in the embodiment described previously, the force produced by the belt drive force and the friction force needs to be larger than the resultant of the force applied by the tension coil spring 72 and the pressing force of the cleaning blade 35.

The housing 71 is rotated in the rotation direction of the intermediate transfer belt 33 about the swinging shafts 73a and 73b, and thus the support shaft 36 attached to the housing 71 is displaced (displaced in a downwardly leftward direction in FIG. 9), with the result that the tension roller 32 is placed in the second position in which the intermediate transfer belt 33 is in the tensioned state. Although the tension of the intermediate transfer belt 33 is gradually increased by the movement of the tension roller 32 in the leftward direction, the support shaft 36 protruding from the side surfaces in the front and back of the housing 71 butts against the butting stages 91a and 91b formed in the frames 90a and 90b and thus the further rotation of the housing 71 is limited, with the result that the tension of the intermediate transfer belt 33 is maintained to be a predetermined value.

Thereafter, when the rotation of the intermediate transfer belt 33 is stopped, the resultant of the force applied by the tension coil spring 72 and the pressing force of the cleaning blade 35 is larger than the force produced by the belt drive force and the friction force, and thus the housing 71 is rotated in a direction (counterclockwise in FIG. 9) opposite to the rotation direction of the intermediate transfer belt 33 about the swinging shafts 73a and 73b. Then, the tension roller 32 is returned by the opposite rotation of the housing 71 to the first position in which the intermediate transfer belt 33 is in the relaxed state. Thereafter, likewise, the tension roller 32 is moved between the first position and the second position by the drive and stop of the drive roller 31, and thus the intermediate transfer belt 33 repeats the tensioned state and the relaxed state.

As in the embodiment described previously, in terms of sufficiently achieving the cleaning functions of the cleaning blade 35, it is desirable to provide, in the housing 71, a discharge path for the non-transferred toner, foreign substances and the like and to provide a mechanism of supplying air, vibrations or the like for removing the non-transferred toner, foreign substances and the like deposited on the cleaning blade 35.

(Third Embodiment)

Figure 14:
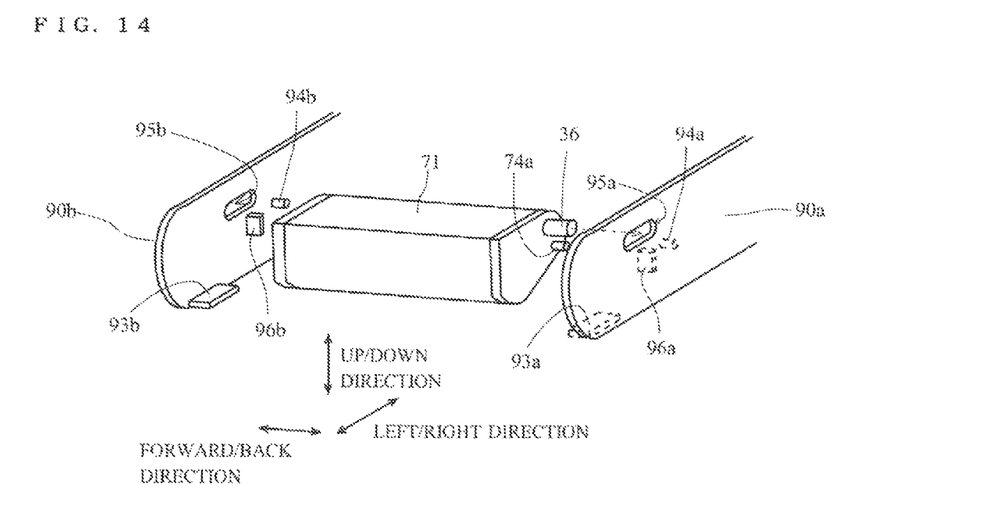
FIG. 14 A perspective view for illustrating the attachment of the housing to the frame of the intermediate transfer belt unit in the third embodiment.
Figure 15:
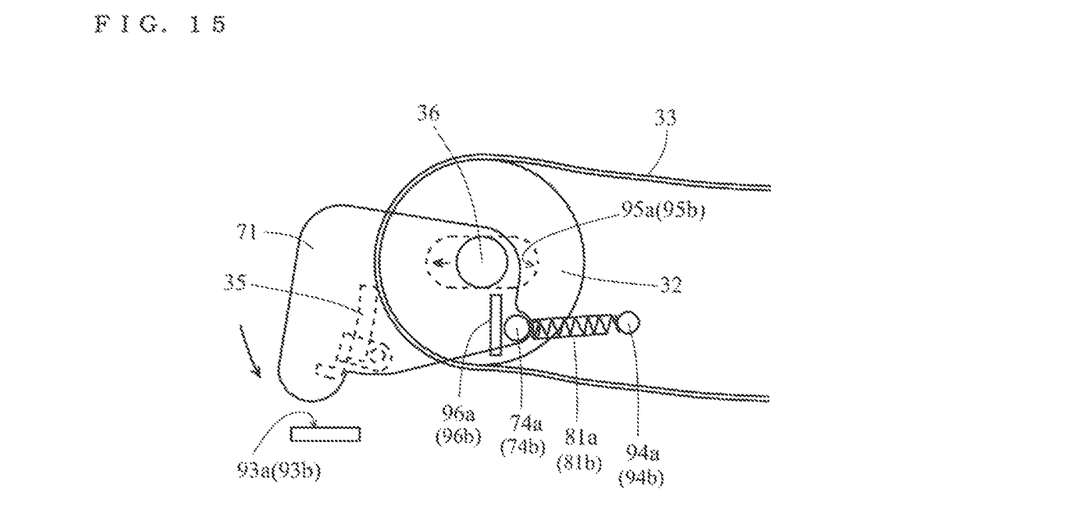
FIG. 15 A peripheral configuration diagram of the tension roller and the cleaning blade when the tension roller in the third embodiment is in the first position.
Figure 16:
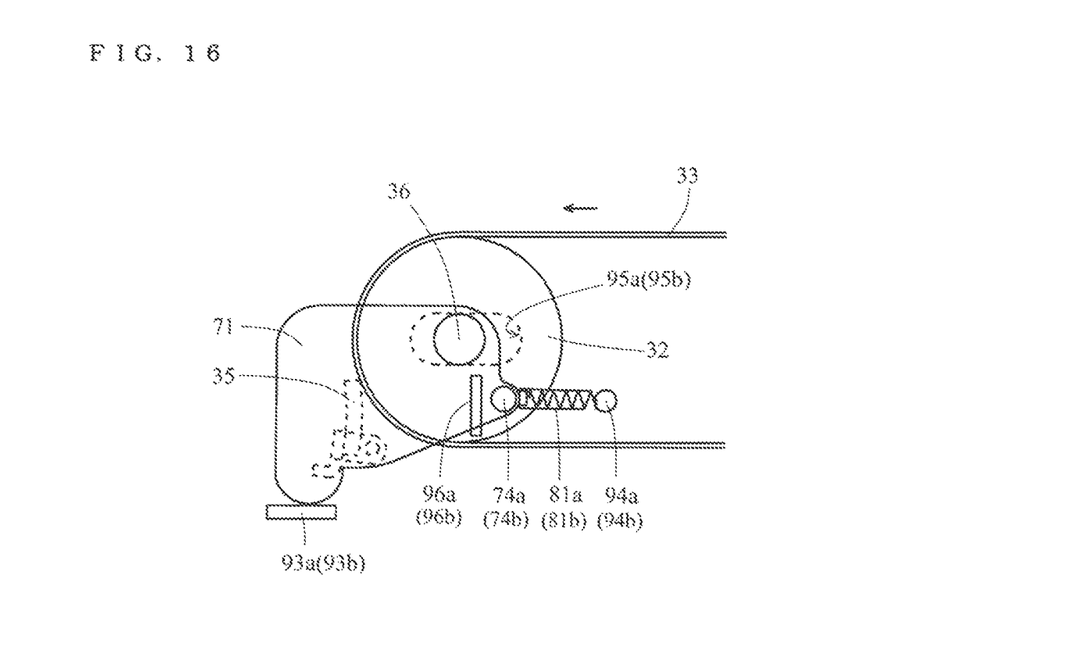
FIG. 16 A peripheral configuration diagram of the tension roller and the cleaning blade when the tension roller in the third embodiment is in the second position.

FIGS. 15 and 16 show configuration diagrams showing another embodiment of the belt tension adjustment mechanism according to the present invention. FIG. 15 is a diagram when the intermediate transfer belt 33 is in the relaxed state, and FIG. 16 is a diagram when the intermediate transfer belt 33 is in the tensioned state. FIG. 14 shows a perspective view for illustrating an attachment to the frames 90a and 90b of the housing 71 though the housing 71 differs in shape from the housing shown in FIGS. 15 and 16.

As shown in FIG. 14, in the frames 90a and 90b arranged separate from and opposite each other in the forward/backward direction, long holes 95a and 95b elongated in the left/right direction are formed. On the side surfaces of the frames 90a and 90b opposite each other, butting stages 93a and 93b, butting plates 96a and 96b and pins 94a and 94b are provided. On the other hand, the support shaft 36 of the tension roller 32 protrudes outward from both the side surfaces in the front and back of the housing 71, and pins 74a and 74b are provided below the support shaft 36. Within the housing 71, the cleaning blade 35 is provided so as to be pressed onto the intermediate transfer belt 33.

The support shaft 36 protruding from the housing 71 is inserted through the long holes 95a and 95b formed in the frames 90a and 90b, and the housing 71 is attached to the frames 90a and 90b such that the housing 71 is swingable about the support shaft 36 and that the support shaft 36 can be moved within the long holes 95a and 95b. Then, between the pins 74a and 74b formed in the housing 71 and the pins 94a and 94b formed in the frames 90a and 90b, compression coil springs 81a and 81b (which are shown in FIGS. 15 and 16) are interposed.

In the belt tension adjustment mechanism configured as described above, when the rotation of the intermediate transfer belt 33 is stopped as shown in FIG. 15, an interval between the pins 74a and 74b and the pins 94a and 94b is formed such that an acting force is not produced by the compression coil springs 81a and 81b. Even in a state where an acting force is produced by the compression coil springs 81a and 81b, the pins 74a and 74b butt against the butting plates 96a and 96b provided on the frames 90a and 90b to regulate the movement, and thus the swinging (movement) of the housing 71 is limited. In this way, the tension roller 32 is in the first position in which the intermediate transfer belt 33 is in the relaxed state. Even in this state, the cleaning blade 35 is pressed onto the intermediate transfer belt 33 with a predetermined pressing formed.

Then, when the drive roller 31 (which is shown in FIG. 1) is driven, though the intermediate transfer belt 33 is in the relaxed state, the intermediate transfer belt 33 is forcibly driven to rotate by the nip portion between the drive roller 31 and the secondary transfer roller 34. Then, a friction force is produced between the intermediate transfer belt 33 and the cleaning blade 35, and thus the housing 71 to which the cleaning blade 35 is attached is rotated against the force applied by the compression coil springs 81a and 81b, in the rotation direction (counterclockwise in FIG. 15) of the intermediate transfer belt 33, about the support shaft 36. Here, a force produced by the belt drive force and the friction force needs to be larger than the resultant of the force applied by the compression coil springs 81a and 81b and the pressing force of the cleaning blade 35.

Then, as shown in FIG. 16, when as the housing 71 is rotated, the interval between the pins 74a and 74b and the pins 94a and 94b is narrowed, and thus the compression coil springs 81a and 81b are compressed to produce an acting force, the support shaft 36 is moved in the leftward direction within the long holes 95a and 95b, and thus the tension roller 32 is placed in the second position in which the intermediate transfer belt 33 is in the tensioned state. Although the tension of the intermediate transfer belt 33 is gradually increased by the movement of the tension roller 32 in the leftward direction, the lower end portion of the housing 71 butts against the butting stages 93a and 93b and thus the tension of the intermediate transfer belt 33 is maintained to be a predetermined value.

Thereafter, when the rotation of the intermediate transfer belt 33 is stopped, the resultant of the force applied by the compression coil springs 81a and 81b and the pressing force of the cleaning blade 35 is larger than the force produced by the belt drive force and the friction force, and thus the housing 71 is rotated in a direction (counterclockwise in FIG. 16) opposite to the rotation direction of the intermediate transfer belt 33 about the support shaft 36. In this way, the compression of the compression coil springs 81a and 81b is released, the support shaft 36 is moved in the rightward direction within the long holes 95a and 95b and thus the tension roller 32 is returned to the first position in which the intermediate transfer belt 33 is in the relaxed state.

As in the embodiment described previously, in terms of sufficiently achieving the cleaning functions of the cleaning blade 35, it is desirable to provide, in the housing 71, a discharge path for the non-transferred toner, foreign substances and the like and to provide a mechanism of supplying air, vibrations or the like for removing the non-transferred toner, foreign substances and the like deposited on the cleaning blade 35.

(Fourth Embodiment)

Figure 17:
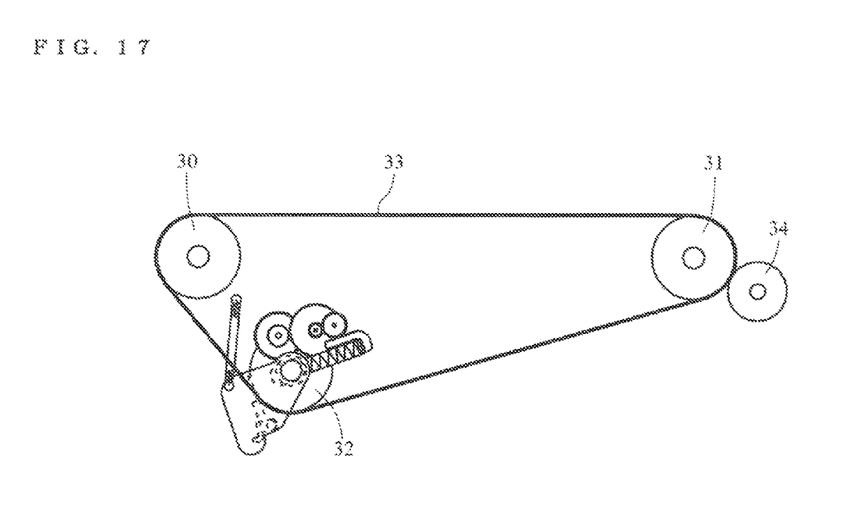
FIG. 17 A schematic view showing another embodiment of a belt tension adjustment mechanism.

FIG. 17 shows a configuration diagram showing another embodiment of the belt tension adjustment mechanism according to the present invention. Although in all the embodiments described above, the intermediate transfer belt 33 is placed over the drive roller 31 and the tension roller 32, in the embodiment shown in FIG. 17, the intermediate transfer belt 33 is placed over the drive roller 31, a driven roller 30 and a tension roller 32. Even in this configuration, the belt tension adjustment mechanism according to the present invention can be applied. In the case of the embodiment shown in FIG. 17, since the driven roller 30 is provided, as compared with the case where the embodiments described above, the size of the intermediate transfer belt unit is increased but as in the embodiments described above, it is not necessary to provide an unnecessary drive torque. Although in the embodiment shown in FIG. 17, as the belt tension adjustment mechanism, the mechanism described in the first embodiment is used, the mechanisms described in the second and third embodiments may naturally be used.

Figure 18:
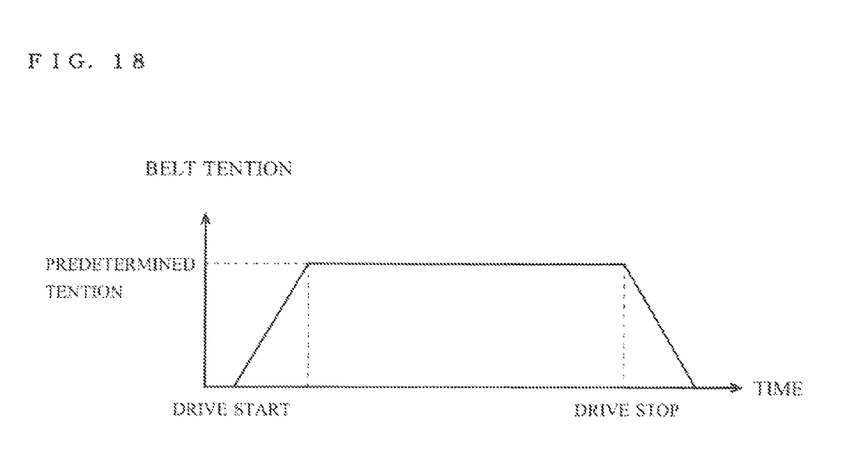
FIG. 18 A diagram showing temporal variations in the tension of the intermediate transfer belt.

FIG. 18 shows temporal variations in the tension of the intermediate transfer belts in the first to fourth embodiments. When the drive roller starts the drive, the tension of the intermediate transfer belt is gradually increased, and the housing butts against a stop member, with the result that the tension is maintained to be a predetermined tension. On the other hand, when the drive of the drive roller is stopped, the tension of the intermediate transfer belt is gradually decreased. The intermediate transfer belt repeats such a change by the drive and stop of the drive roller.

(Others)

Although in the embodiments described above, the belt tension adjustment mechanism of the present invention is used to adjust the tension of the intermediate transfer belt in the image forming apparatus, the belt tension mechanism of the present invention is not limited to this configuration but can be used in a conventional known belt drive mechanism.

The number of rollers over which the belt is placed is not limited, and four or more rollers may naturally be used.

What is claimed is:

1. A belt tension adjustment mechanism comprising:
   a tension roller which is brought into contact with an inner circumferential surface of an endless belt and is rotated and which can be moved to a first position where the belt is in a relaxed state and a second position where the belt is in a tensioned state;
   a butting member which butts against the belt;
   a force application unit which applies, to the butting member, a force acting in a direction opposite to a rotation direction of the belt; and
   a movement mechanism which moves the tension roller to the first position and the second position,
   wherein when the belt is rotated, the butting member is moved in the rotation direction of the belt by a friction force with the belt, and the movement mechanism moves the tension roller from the first position to the second position by movement of the butting member in the rotation direction of the belt, and
   when the rotation of the belt is stopped, the butting member is moved in the direction opposite to the rotation direction of the belt by the force applied by the force application unit, and the movement mechanism moves the tension roller from the second position to the first position by movement of the butting member in the direction opposite to the rotation direction of the belt.

2. The belt tension adjustment mechanism according to claim 1,
   wherein the butting member is an elastic member which has a substantially equal length to a length of the belt in a width direction.

3. The belt tension adjustment mechanism according to claim 1,
   wherein the butting member butts against the tension roller through the belt, and can be moved in a circumferential direction about a support shaft of the tension roller,
   the movement mechanism includes a compression coil spring whose one end butts against the support shaft of the tension roller and a compression mechanism which compresses the compression coil spring when the butting member is moved in the rotation direction of the belt,
   when the butting member is moved in the rotation direction of the belt by the rotation of the belt, the compression coil spring is compressed by the compression mechanism, and the tension roller is moved from the first position to the second position and
   when the rotation of the belt is stopped, the butting member is moved by the force application unit in the direction opposite to the rotation direction of the belt, the compression of the compression coil spring by the compression mechanism is released and the tension roller is moved from the second position to the first position.

4. The belt tension adjustment mechanism according to claim 1, wherein the butting member butts against the tension roller through the belt, the movement mechanism rotatably supports a support shaft of the tension roller, supports the butting member and is a housing which can be swung about a swing shaft different from the support shaft, when the butting member is moved in the rotation direction of the belt by the rotation of the belt, the housing is moved about the swing shaft in the rotation direction of the belt, and the tension roller is moved from the first position to the second position and when the rotation of the belt is stopped, the housing is moved by the force application unit about the swing shaft in the direction opposite to the rotation direction of the belt, and the tension roller is moved from the second position to the first position.

5. The belt tension adjustment mechanism according to claim 1, wherein the butting member butts against the tension roller through the belt, and can be moved in a circumferential direction about a support shaft of the tension roller, the force application unit is a compression coil spring, the movement mechanism is a housing which supports the butting member and which can be swung about the support shaft, when the butting member is moved in the rotation direction of the belt by the rotation of the belt, the housing is moved about the support shaft in the rotation direction of the belt to compress the compression coil spring and the tension roller is moved from the first position to the second position and when the rotation of the belt is stopped, the housing is moved by the compression coil spring about the support shaft in the direction opposite to the rotation direction of the belt, and the tension roller is moved from the second position to the first position.

6. An image forming apparatus comprising:

an endless intermediate transfer belt which is placed over a plurality of rollers; and a cleaning blade which removes a non-transferred toner from a surface of the intermediate transfer belt, wherein as a tension adjustment mechanism of the intermediate transfer belt, the belt tension adjustment mechanism according to claim 1 is used, and as the butting member, the cleaning blade is used.

* * * * *